May 3, 1932. A. A. GASSNER 1,856,157

LATERAL CONTROL FOR AIRPLANES

Filed Oct. 3, 1931 2 Sheets-Sheet 1

Inventor
Alfred A. Gassner

By Frederick A. Lind
Attorneys

May 3, 1932.   A. A. GASSNER   1,856,157
LATERAL CONTROL FOR AIRPLANES
Filed Oct. 3, 1931   2 Sheets-Sheet 2

Inventor
Alfred A. Gassner
By Frederick A. Lind
Attorneys

Patented May 3, 1932  1,856,157

UNITED STATES PATENT OFFICE

ALFRED A. GASSNER, OF NEW YORK, N. Y., ASSIGNOR TO GENERAL AVIATION CORPORATION, OF NEW YORK, N. Y., A CORPORATION OF DELAWARE

LATERAL CONTROL FOR AIRPLANES

Application filed October 3, 1931. Serial No. 566,682.

My invention relates to airplanes and has particular relation to means for effecting lateral control thereof.

In the manufacture of airplanes considerable difficulty has been encountered in distributing the weight evenly in a lateral direction, as various kinds of equipment of various weights and dimensions must be installed and obviously cannot all be mounted on the fore and aft centerline of the airplane. Also, any slight repair, especially near the ends of the wings, will serve to increase the weight of that portion and thus unbalance the airplane laterally. Such unbalanced loading, ordinarily referred to as wing heaviness, heretofore had to be compensated for by the pilot in steering the airplane, and constituted a characteristic of that particular airplane with which the pilot had to become acquainted in order to have perfect control.

The object of my invention consists in providing a means whereby an airplane may be balanced laterally by permanently or temporarily increasing or decreasing the lift of either end of the wing, as may be desired, in order to compensate for unequal distribution of the weight or of the lift in a lateral direction.

For a better understanding of my invention reference may now be had to the accompanying drawings of which:

Figure 1:
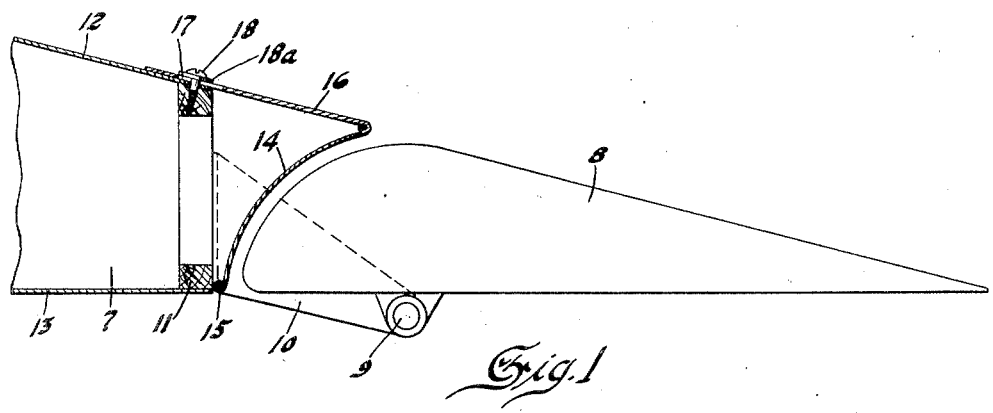
Fig. 1 is a side view, partially in section, of a portion of a wing and aileron constructed in accordance with one form of my invention.
Figure 2:
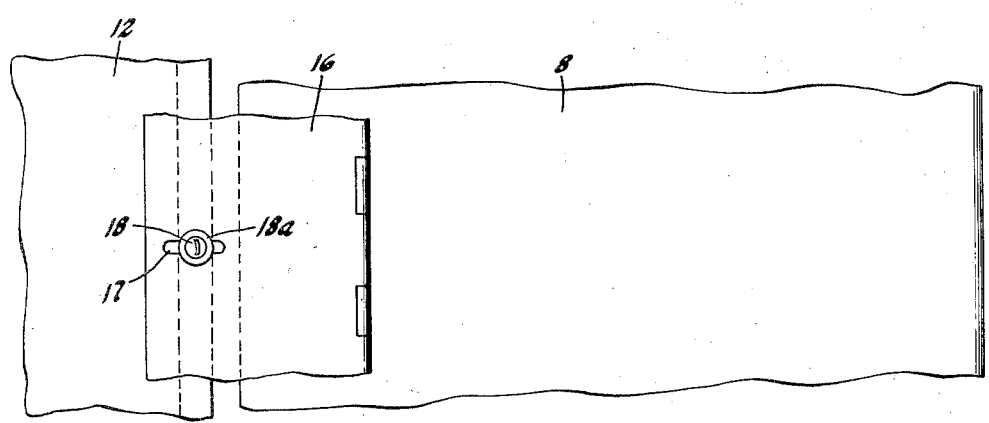
Fig. 2 is a plan view of the structure illustrated in Fig. 1.
Figure 3:
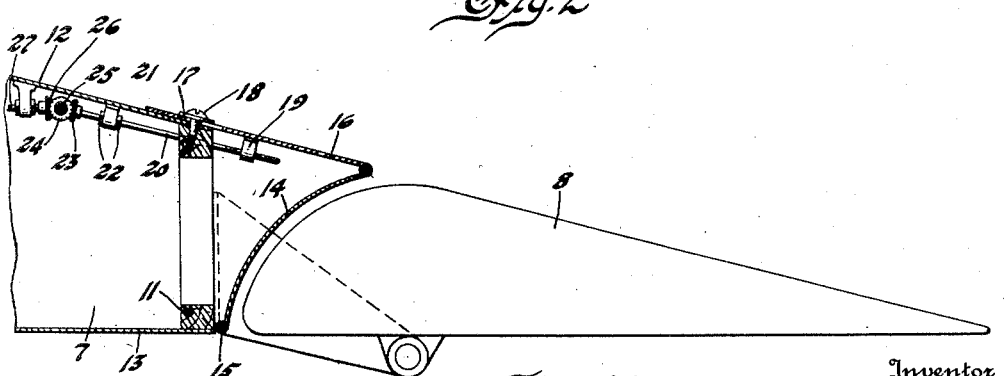
Fig. 3 is a side view, similar to Fig. 1, illustrating means for permitting control of the balancing device from a remote point, such as the pilot's cabin.

Referring to the drawings in detail, I have shown, in Figs. 1 and 2, a portion of an airplane wing 7, the section being taken at the recess normally provided for the reception of an aileron. An aileron 8, of the Friese type is pivotally mounted at 9 on a support 10 secured to the rear portion of the wing 7, preferably to a spar 11 or other substantial support. The aileron is of the usual Friese type and embodies no novel or unusual features. The wing consists of an upper surface 12 and a lower surface 13, preferably comprised of sheet metal, both of which are secured to and end at the spar 11. An arcuate concave sheet metal member 14, of equal span with the aileron, is pivotally secured at 15 to the spar 11 at the point where the lower cover member 13 ends. Pivotally secured to the upper edge of the arcuate member 14 is a flat sheet metal plate 16 the other end of which lies flatly against the upper surface 12 of the wing and is provided with a fore and aft extending slot 17 through which a screw or other suitable securing means extends into the spar 11. The screw 18 may be provided with a washer 18a, as shown, of considerably greater diameter than the width of the slot 17. The member 16 may be adjusted in a fore and aft direction by loosening the screw 18, moving the member 16 to the desired position and again tightening the screw. Fore and aft movement of the member 16 likewise moves the arcute member 14 in the same direction, thus varying the gap between the end of the wing and the aileron 8. Air flow through this slot from the underside of the wing to the upper side tends to diminish the suction on the upperside of the wing thus decreasing the lift of that end of the wing. By decreasing or increasing the width of this slot the amount of air flow from the underside to the upperside may be controlled. Closing the slot between the wing and one aileron to a greater degree than the slot between the wing and the other aileron, increases the lift of the wing on the side with the smaller slot, thus giving it a slightly greater lift in flying than the other end of the wing. By adjusting the width of the slot properly, any slight unbalance in the loading, or wing heaviness, may be compensated for, so that the plane will fly in a laterally balanced condition without especial attention to such wing heaviness by the pilot. In Fig. 3 the structure is identical with that shown in Fig. 1 except that the plate 16 is provided with a plurality of similarly disposed screw threaded lugs 19 through each of which passes a threaded shaft 20. The threaded shafts 20 pass through arbors 21, arranged in a row, and secured to the inner face of the upper covering 12 of the wing. On the shaft 20, on both sides of the arbor 21 are disposed members 22, which permit rotation of the shaft 20 within the harbor 21 but prevents longitudinal movement thereof. The other end of the shaft 20 is provided with a gear wheel 23, which is driven by a similar gear wheel 24 mounted on a transversely extending shaft 25, on which are mounted additional gear wheels, (not shown) similar to 24 to operate the other shafts (not shown) corresponding to 20. The shaft 25 is operated, through a suitable gearing connection 26 by a shaft or rod 27, the other end of which extends to the pilot's cabin. By rotation of the rod 27, each of the threaded rods 20 is rotated, thus moving the plate 16 forwardly or rearwardly from the pilot's cabin. It will be understood that in this construction the screw 18 does not rigidly fix the member 16 to the cover 12 but is tightened only sufficiently to hold those members in close but slidable engagement. It will be understood that the length of the slot 17 is such that the plate 16 cannot be moved rearwardly far enough to engage the aileron 8.

Figure 4:
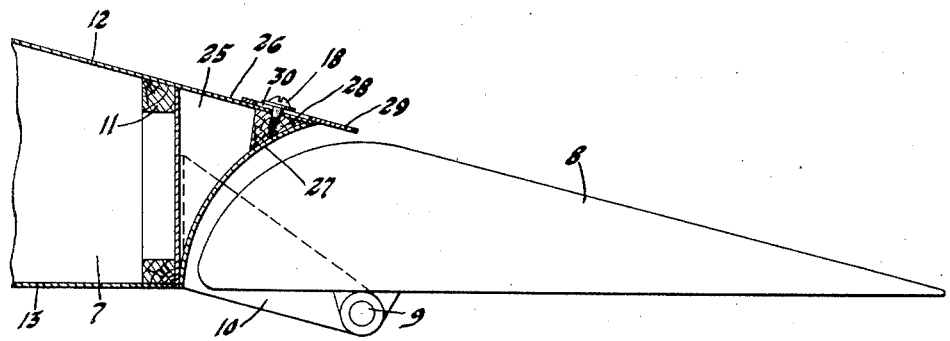
Figs. 4, 5 and 6 are views similar to Figs. 1, 2 and 3, respectively, of another form which my invention may assume.
Figure 5:
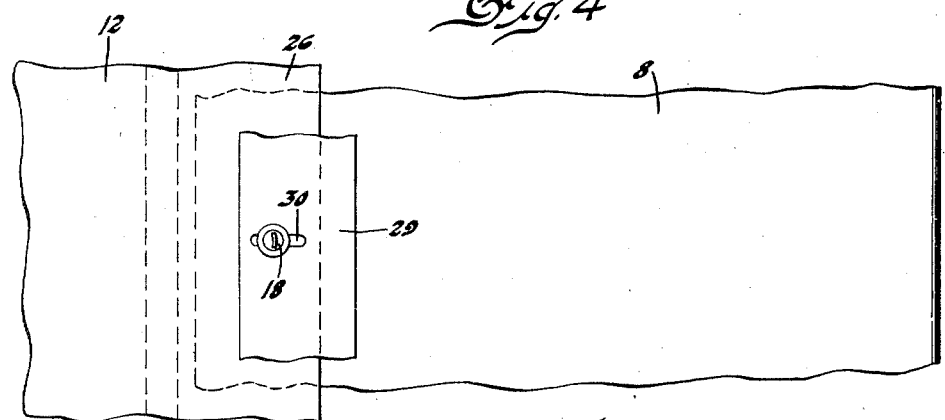

The structure illustrated in Figs. 4 and 5 differ from that illustrated in Fig. 1 in that the rear portion of the wing comprises a rigidly fixed portion 25 having a flat upper cover 26, which is an extension of the cover member 12, and an arcuate portion 27. At the junction of the surface 25 and 27, and on the interior side thereof, is a block 28, composed of wood or other suitable material, in to which the screw 18 is fastened. Mounted in engagement with the upper cover member 26 of the wing end is a flat plate 29, preferably composed of sheet metal, provided with a fore and aft recess 30 through which a screw 18 passes to hold the plate 29 in any desired position within the range of the slot 30. By loosening the screws 18, of which a plurality are disposed along the rear edge of the wing, the plate 29 may be moved fore and aft, as may be desired, in order to increase or decrease the width of the slot between the wing and the aileron, thus securing a result similar to that described in connection with Fig. 1.

Figure 6:
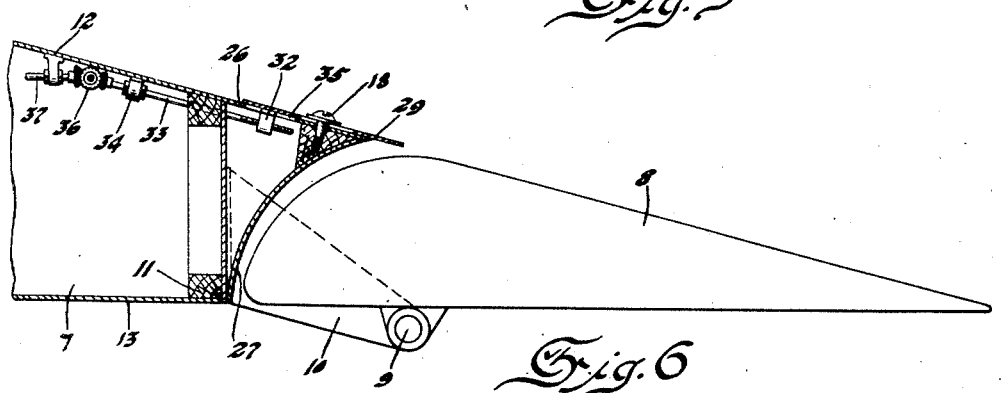

The structure illustrated in Fig. 6 is similar to that of Fig. 4 except that the plate 29 is provided with a row of lugs 32 each having an internally threaded opening therein through which a threaded rod 33 passes. Each rod 33 also passes through corresponding bushing 34 secured to the inner face of the upper cover 12 of the wing 7 in such manner as to permit rotation of the rod but to prevent longitudinal movement thereof. The cover 26 is provided with slots 35 to permit fore and aft movement of the lugs 32. By means of the gearing mechanism 36, as described in connection with Fig. 3, the rods 33 are connected to a forwardly extending rod 37 which extends to the pilot's cabin. By rotating the rod 37 the plate 29 may be moved fore and aft as desired to vary the width of the gap.

Although I have illustrated several forms of my invention, and have described in detail one application thereof, it will be obvious to those skilled in the art that it is not limited but that various modifications and changes may be effected therein without departing from the spirit of my invention or from the scope of the appended claims.

I claim:

1. In an airplane, a wing, an aileron secured to said wing in spaced relation thereto, and means movably mounted on said wing and adapted to vary the space between the wing and the aileron.

2. In an airplane, a wing, an aileron secured to said wing in spaced relation thereto, and means for varying the gap between the wing and the aileron comprising a member adapted to be rigidly secured to said wing in any one of a plurality of positions.

3. In an airplane, a wing, an aileron of the Friese type secured to said wing in spaced relation to a rear edge portion thereof, a plate movably mounted on the wing adjacent the aileron, and means for controlling the position of said plate from a remote point.

4. In an airplane, a wing, an aileron having a substantially arcuate leading edge secured to said wing in spaced relationship, means secured to said wing for varying the gap between the wing and the aileron comprising a flat plate secured to the upper surface of said wing adjacent said gap and provided with means permitting adjustment of said plate toward and away from said aileron.

5. In an airplane, a wing having a portion provided with a concave arcuate rear edge, an aileron provided with a convex arcuate leading edge mounted on said wing in spaced relation to said arcuate rear edge, and a flat plate secured to the upper surface of said wing adjacent said aileron, and movable toward and away from said aileron.

6. In an airplane, a wing having a portion provided with a rear edge comprising a pivotally mounted arcuate sheet metal member, an aileron having a convex arcuate leading edge mounted on said wing in spaced relation to said rear end portion, and means for moving said pivotally mounted member toward and away from said aileron.

7. In an airplane, a wing having a recess in its rear edge, a Friese type aileron mounted in said recess, and adjustable means for varying the gap between the wing and the aileron.

8. In an airplane, a wing having a recess therein, the rear edge of said recessed portion of the wing comprising an arcuate concave sheet metal member hinged at one end to the lower edge of said wing, and a substantially flat sheet metal plate secured to the top surface of said wing and projecting rearwardly therefrom, the rear edge of said plate being hinged to the upper edge of said arcuate member, and means for adjusting said plate rearwardly and forwardly.

9. In an airplane, a wing having a recess therein, the rear edge of said recessed portion of the wing comprising an arcuate concave sheet metal member hinged at one end to the lower edge of said wing, and a substantially flat sheet metal plate secured to the top surface of said wing and projecting rearwardly therefrom, the rear edge of said plate being hinged to the upper edge of said arcuate member, said plate being adjustable rearwardly and forwardly, and means for adjusting the position of said plate from a point remote therefrom.

ALFRED A. GASSNER.